United States Patent [19]

Baumann

[11] Patent Number: 4,677,355
[45] Date of Patent: Jun. 30, 1987

[54] ELECTRIC-POWERED SPRING-RETURN ACTUATING DEVICE

[76] Inventor: Peter H. Baumann, 32 Pine St., Rye, N.H. 03870

[21] Appl. No.: 867,318

[22] Filed: May 27, 1986

Related U.S. Application Data

[63] Continuation-in-part of Ser. No. 718,799, Apr. 1, 1985, Pat. No. 4,613,798.

[51] Int. Cl.⁴ ............................................. F16K 31/04
[52] U.S. Cl. ........................................ 318/160; 318/9; 318/40; 318/54; 251/25; 251/129.11
[58] Field of Search ......................... 318/9, 40, 54, 159, 318/160, 436, 8, 159; 192/142 R; 251/25, 129.01, 129.02, 129.11, 129.12, 129.13

[56] References Cited

U.S. PATENT DOCUMENTS

| | | | |
|---|---|---|---|
| 3,150,752 | 9/1964 | Baumann | 192/142 R |
| 3,682,283 | 8/1972 | Sato | 192/142 R X |
| 3,987,818 | 10/1976 | Williams | 251/25 X |
| 4,097,786 | 6/1978 | Lund | 318/282 |
| 4,609,176 | 9/1986 | Powers | 251/129.11 X |
| 4,613,798 | 9/1986 | Baumann | 318/160 |

Primary Examiner—William M. Shoop, Jr.
Assistant Examiner—Bentsu Ro

[57] ABSTRACT

Electric-powered actuating device usable for the positioning control of valves and the like, featuring a motor, mechanical and spring means capable of driving said valve or other attached devices into a predetermined safety position in case of electrical signal or power failure; said actuating device having electrical amplifying means capable of providing pulsed current to drive said motor in one direction in response to an input signal, a constant current to hold said motor in a selected position, or no power, to allow the mechanical and spring means to reverse the motor direction; additional means are provided to limit the travel to a selected position despite further increases in input signal.

5 Claims, 2 Drawing Figures

ELECTRIC-POWERED SPRING-RETURN ACTUATING DEVICE

This is a continuation in part of my co-pending patent application Ser. No. 06/718,799 filed on Apr. 1, 1985, now U.S. Pat. No. 4,613,798.

BACKGROUND OF THE INVENTION

This invention constitutes a major improvement in electric actuators heretofore used for the driving of valves and other devices following the command signal of an automatic controller or computing device. A typical example for prior state of the art device is found in U.S. Pat. No. 3,150,752 by Baumann. Here a stepping motor converts electrical impulses into small turns of a lead screw which in turn drives a reciprocating valve stem up or down. With either power or signal failure, the actuator will remain in the last position of the lead screw, a condition that does not satisfy requirements of most automatic control valve applications.

A fuel control valve to a boiler should fail-close, in order to avoid a possible overheating, if electrical failure occurs. Certain coolant control valves, on the other hand, should fail-open.

There is, therefore, a great need for so-called fail-safe electric valve actuators to replace the currently used pneumatically actuated and fail-safe spring-diaphragm actuators. Presently used electric actuators employ gear drives or threaded spindles to convert the relatively high-speed electric motor revolutions into higher forces but slower output motion. It is inherent in these high mechanically amplified devices that their efficiency is less than 30%, negating any possibility of reversing the motion by spring means to achieve the desired "fail-safe" action. Other attempts have been made to drive the motor into a safe position upon an electric line failure by means of a relay switched battery. However, such a solution is not only awkward and space consuming but offers only limited reliability unless the battery is maintained periodically.

Operators using gear trains as mechanical amplification of forces suffer from wear and, more importantly, back-lash which impedes the desired accuracy of the actuator.

This invention overcomes these and other disadvantages of the current state of the art devices. Instead of gear speed reduction, the invention uses a double-pitched cable drive, which not only offers no back-lash caused by play between meshing gear teeth, but achieves great mechanical amplification with up to 80% efficiency. Such high efficiency in turn allows the use of mechanical springs to reverse the rotation of the electric motor drive in order to achieve a desired safety position following a power failure.

Connecting the spring-loaded actuating stem directly onto a valve shaft, eliminates problems of conventional mechanical override mechanisms to absorb thermal expansion of a valve shaft, featured, for example, in U.S. Pat. No. 3,150,752. The absence of gears and mechanical override devices leads to a dramatic simplification, great cost savings and a substantial increase in reliability over present similar devices.

An amplifying circuit is further designed to drive the motor only in a direction opposite to the direction of the spring force. Upon reaching the desired valve position, the motor drive current is replaced by a locking DC current. For reverse action, the DC current is switched off, allowing the spring force to drive the motor backwards. This "One-Way" switching action greatly simplifies the electronic control circuit, leading to important cost savings and increase in reliability.

Another important object of the invention is the provision of electronic means to limit the actuator travel whenever the feed-back voltage as function of the travel reaches an adjustable value of the input signal voltage, which then blocks all further stepping power to the actuator motor. This prevents the motor from reaching a stalled position and prevents it from going out of control. All this is accomplished with electronic means and without resorting to cumbersome mechanical switching means such as utilized in U.S. Pat. No. 4,097,786, for example.

These and other important advantages and improvements will be more clearly shown in the following description of the invention and in conjunction with the accompanying drawings, in which.

DESCRIPTION OF MY INVENTION

Figure 1:
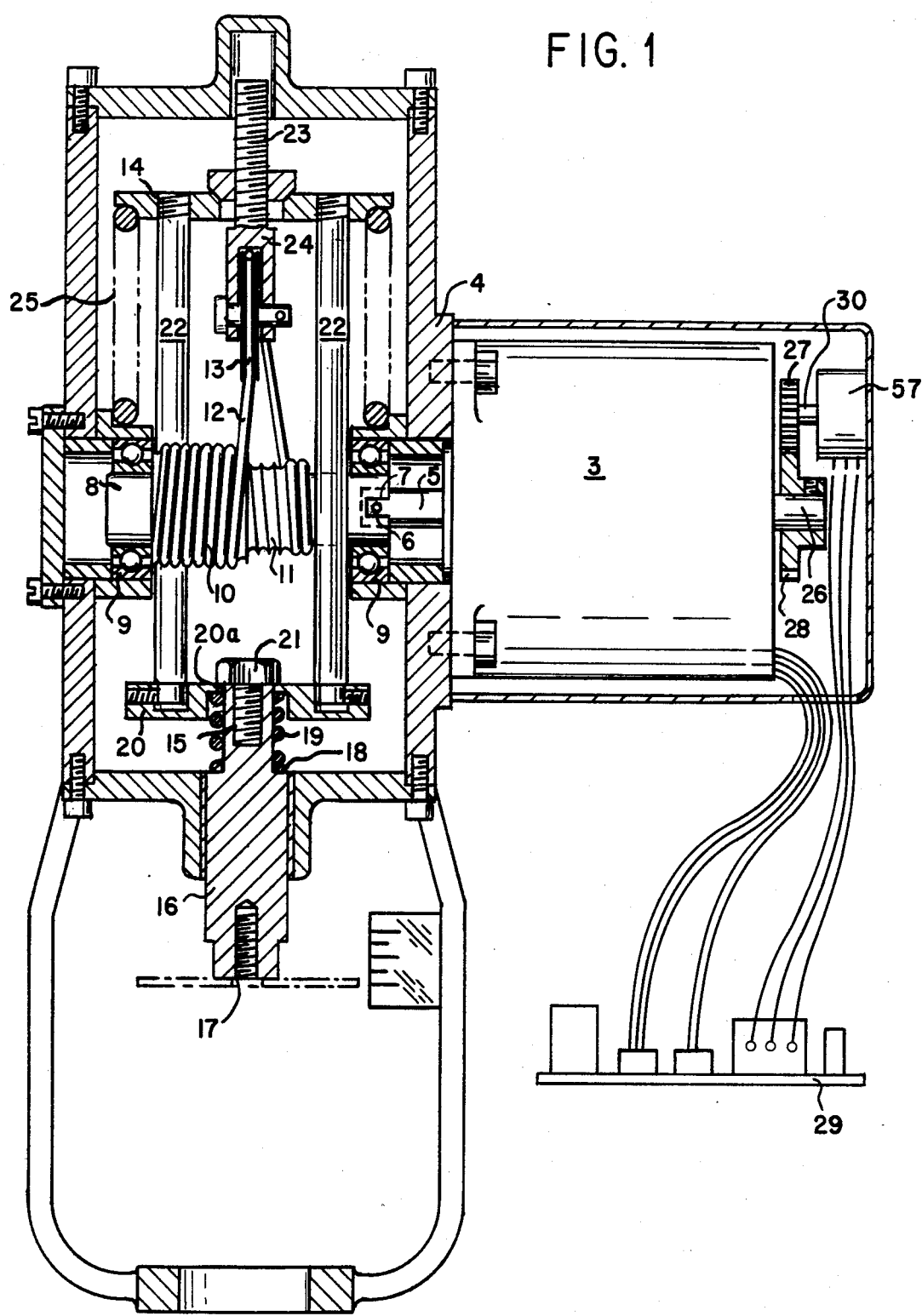
FIG. 1 is a vertical, partially sectional view of a preferred embodiment of the invention.

Referring to FIG. 1, an electric motor 3, preferably a so-called DC hybrid motor and capable of operating continuously with 24 V DC at approximately 200 steps per minute, is connected to an actuator frame 4. The output shaft 5 of said motor has a drive pin 6 slidingly engaging a slotted opening 7 of a spindle 8 which is supported on each end by ball bearings 9. Spindle 8 is divided into two threaded sections; the first one 10 has, in a preferred configuration, a pitch diameter of 1.000 inch, while the second one 11 has a pitch diameter of 0.900 inch. A steel cable 12 is wound around the larger pitch diameter 10, then through a pulley 13 and finally around the smaller pitch diameter portion 11, before each end is suitably anchored within spindle 8.

Threaded portions 10 and 11 have opposite pitch angles to enable the cable to move towards the centrally located pulley 13 without undue strain. Pulley 13 is suitably fastened to a yoke 14, the lower part of which engages the top portion 15 of an actuator stem 16, whose lower end 17 is configured to engage valve stems and the like. Actuator stem 16 has a shoulder portion 18 which supports a spring 19 compressively engaging a lower plate 20 against a bolt 21 which in turn is fastened to stem 16. Whenever stem 17 is prevented from further down-travel such as the seating of an attached valve plug, then yoke 14 can continue to move plate 20 down by overcoming the preselected load of spring 19 and allowing portions 15 to slide through an opening 20a of plate 20.

Guide pins 22 prevent yoke 14 from rotating, while stem thread 23 as part of pully assembly 24 is engaged to provide tightening of cable 12 and pre-compression of a second spring 25 during the initial assembly phase. This second spring 25 allows to pull up stem 16 whenever the motor is de-energized or, in case of power failure.

Figure 2:
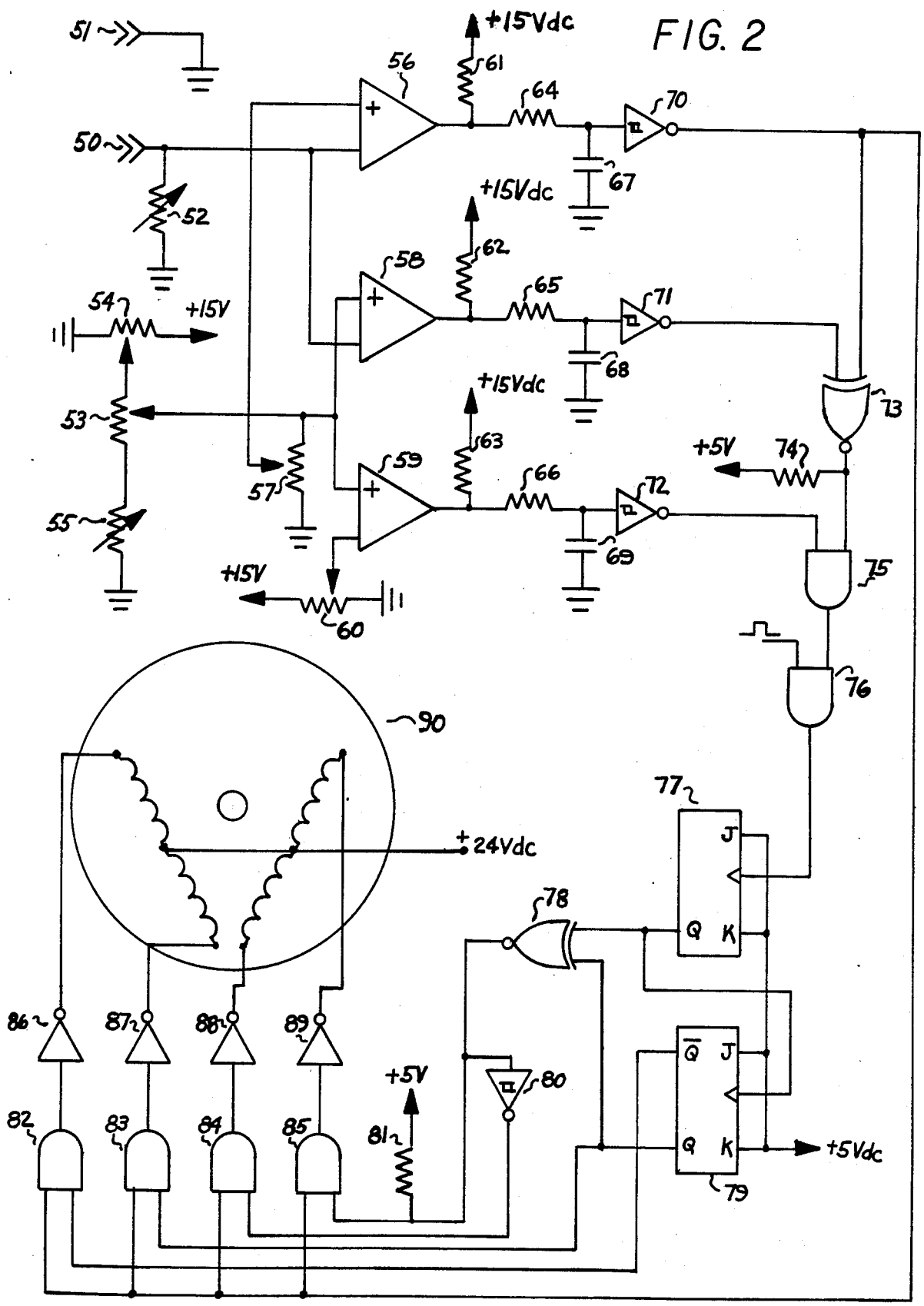
FIG. 2 is a schematic circuit diagram showing the arrangement of components of the electronic logic and amplifying system.

Any left-hand rotation of motor shaft 5, caused by a suitable current switching by the electronic circuit shown in FIG. 2, will turn spindle 8 via pin 6. This will wind further cable 12 onto the larger pitch diameter portion 10 (1.00×3.14 inches/turn) while, at the same time, unwinding from the smaller diameter portion 11 at the rate of 0.90×3.14 inches/turn. The end result is that pulley 13 advances at one-half the difference between the up and down motions of cable 12, i.e. 0.5 $(1.00 \times 3.14 - 0.90 \times 3.14) = 0.157$ inches/turn of motor shaft 5. Expressed differently, the pulley motion=1.57 times the difference in pitch diameter per motor turn. The theoretical mechanical advantage thus derived in the preferred embodiment can be calculated by comparing the work done by the motor to the work produced in pulling a force attached to the pulley. In one example, a motor with 15.8 inch-lbs. torque will produce a work output of $15.8 \times 2 \times 3.14 = 99.27$ inch-lbs. per turn. Since the pulley 13 motion is 0.157 inch, the theoretical force that the pulley may move against is now $99.27/0.157 = 632$ lbs.; a mechanical advantage of 40:1, (632/15.8).

This high-force amplification is possible without need for a large number of successive gear trains with their associated backlash and wear problems. The differential cable system is accomplishing this task at efficiencies approaching 80%, a feat not possible with 40:1 gear train ratios (the resultant gear efficiency is generally below 50%, which would make the whole system unworkable).

Since the efficiency of the cable system is well above 50%, the force of spring 25 is able to back-drive the motor shaft 5 in the reverse direction should the electronic logic system of FIG. 2 call for a reverse in direction of else, should either the controller signal or the motor current fail. In the latter case, actuator stem 16 will move up, propelled by the force of spring 25, to open an attached valve (not shown).

In order for the logic system (FIG. 2) to sense the motor stem position, motor 3 has a second, opposed shaft 26 engaging by means of gears 27 and 28 the shaft 30 of a rotary potentiometer 57 calibrated to typically produce a 1 to 15 volt DC output signal in proportion to the motion of stem 16.

A separate circuit board 29 contains electronic logic and switching elements, is more closely described below and shown in FIG. 2.

While the shown configuration has actuator stem 16 retract on power failure, a suitable reversal of the mechanical element in the invention could provide means to pull the stem down on power failure, in order to provide a "Fail-Close" valve position for example.

The electronic circuit shown in FIG. 2 may be described as follows:

Refering to FIG. 2, a 4–20 mA controller signal enters the circuit from an externally generated current source, such as a process control computer of conventional art and as a function of a sensed controlled variable, at terminals 50 and 51. The positive portion of the signal being applied to terminal 50 and the negative portion being applied to terminal 51. The controller signal is then converted at terminal 50 to a controller signal voltage by a factory preset potentiometer 52, shunted to ground.

A feedback voltage is generated by potentiometer 53. The feedback voltage span and zero adjustment are provided by potentiometer 54 in conjunction with potentiometer 55.

The controller signal voltage and the feedback voltage are then double compared. The first comparison occurs with the controller signal voltage applied to the inverting input of voltage level comparator 56, and the feedback voltage applied, through potentiometer 57, to the non-inverting input of comparator 56. The second comparison occurs with the feedback voltage applied to the non-inverting input of voltage comparator 58, and the controller signal voltage applied to the inverting input of comparator 58. The resulting signals from these comparisons are used to indicate the relative relationship between the actual actuator stem position, as indicated by the feedback voltage, and the desired actuator stem position, as indicated by the controller signal voltage. Potentiometer 57 provides the circuit with an adjustable sensitivity.

A third comparison takes place with the feedback voltage applied to the non-inverting input of voltge level comparator 59, and a travel limit voltage, adjustable 0 to 15 vDC by potentiometer 60, applied to the inverting input of comparator 59. The resulting error signal from This comparison is used to indicate that full travel has been achieved and that any further travel signal should be ignored. This logic circuit acts as a solid state travel limit stop and prevents the motor from stalling out when a mechanical stop is reached. Such stalling out is highly undesired since the motor will slip phase and loose power, following which the return spring will drive the motor back in the opposite, undesirable direction.

Resistors 61, 62, and 63 provide the necessary pull-up resistance to generate output signals from comparators 56, 58, and 59.

The output signals from comparators 56, 58, and 59 are then passed through filters, each consisting of a series resistor 64, 65, 66 and a capacitor 67, 68, 69, shunted to ground, designed to provide a time delay to prevent instability in the circuit and to reduce the comparator output signals to more TTL compatible levels. Each signal is then passed through a Schmitt Trigger Inverter 70, 71, 72, which completes the filtering process by logically inverting the signals and defining them as either TTL logic 1's or 0's.

The filtered signals from comparators 56 and 58 are applied to the two inputs of X-NOR gate 73. The output from this X-NOR gate is applied, in parallel, to resistor 74, which provides the necessary pull-up resistance, and to the input of AND gate 75. The filtered signal from comparator 59 is applied to the remaining input of AND gate 75, and the resulting output from this AND gate is then applied to the input of AND gate 76. A clock pulse signal, originating from a square wave source, such as a 555 Timer circuit, is applied to the remaining input of AND gate 76. The function of this logic network is to determine, based on the results of the three voltage comparisons, whether or not to pass said square wave signal onto the rest of the circuitry.

The output from AND gate 76, here after refered to as "CLOCK", is applied to the clock input for J-K Flip/Flop 77, which is configured in toggle mode. The Q output from said Flip/Flop is applied as an input to X-NOR gate 78 and also as the clock input to J-K Flip/Flop 79, which is configured in toggle mode.

The Q output from J-K Flip/Flop 79 is used as step control signal 3, and also as the second input to X-NOR gate 78. The output of X-NOR gate 78 is used as step control signal 1 and, after passing through Inverter 80, as step control signal 2. Resistor 81 provides the necessary pull-up resistance. Step control signal 4 is derived from the Q-not output of J-K Flip/Flop 79.

Step control signals 1 through 4 are applied as inputs to four individual AND gates, 85, 82, 83, 84, with each step control signal being applied to the input of one and only one AND gate. The remaining input for the four AND gates, 85, 82, 83, 84, is provided by the filtered output from comparator 56. This signal, here after, is refered to as "ENABLE".

"ENABLE" allows step control signals 1 through 4 to pass through AND gates 85, 82, 83, and 84 to their perspective current drivers, 89, 86, 87, 88. Drivers 89, 86, 87, and 88, when activated, provide the necessary current to energize the required windings of a DC stepping motor to produce the desired effect as determined by the controller signal voltage vs. the feedback voltage relationship.

The basic purpose and desired function of the control circuit as exemplified in FIG. 2 is to assure that the ultimate position of the stem 16 is in direct proportion to the 4 to 20 mA signal that is issued by said external control device. When the circuit is subjected to a 4 mA signal, the stem 16 should, typically, be in the highest (retracted) position corresponding to an open valve, if such valve would be connected to the actuating device, while a 20 mA signal customarily calls for a fully closed valve i.e. a fully extended stem 16.

The circuit converts the 4 to 20 mA signal to a corresponding voltage signal which is then compared to a feedback voltage that is generated by a potentiometer 57 (See FIG. 1). Both voltages have to be balanced to satisfy the steady state circuit requirements, that is, the rotary position of the potentiometer 57 and thereby the position of the stem 16 has to correspond to the input signal level. If there is a positive imbalance between the two voltages, then suitably pulsed electric currents are provided to the motor 3 to move the stem 16. For a negative imbalance between the input signal voltage and the feedback voltage, all power to the motor 3 is disconnected and spring 25 is allowed to pull the stem 16 up. After the stem 16 has moved up sufficiently to cause the potentiometer 57 to produce a lower voltage corresponding to the input signal voltage, then the circuit will provide suitably constant currents to the motor 3 as required to hold the actuating device in this desired position.

It should be recognized that numerous changes can be made by a person of ordinary skill in the art without departing from the scope of the following claims. For example, the amplifying circuit could be modified to initiate pulse signals to the motor not only in the direction opposed to the return spring force but also in the same direction to allow for a more precise descending motion. Such a more costly and complicated version is well anticipated by the invention even though it is not preferred.

Another modification would consist of placing the amplifying circuit external of the actuator, inside the main frame of a computer, for example.

I claim:
1. Electric actuating means comprising:
   (a) at least one electric motor having a shaft;
   (b) feedback means for generating a feedback signal;
   (c) electric amplifying circuit means for receiving an electric control signal and said feedback signal, and capable of selectively activating said motor;
   (d) mechanical means coupled to said shaft for converting more than fifty percent of the motor's electrical power into mechanical power, said mechanical means coupled to at least one mechanical spring, the spring capable of overcoming mechanical or electrical resistance forces and further being able, together with said mechanical means, to rotate said shaft whenever said motor is substantially de-energized and wherein said mechanical means comprises a suitably supported spindle having two separate threaded sections with different pitch diameters, at least one cable, portions of said cable being wound around said threaded sections of said spindle, and one or more pulleys for engaging said cable and motivating to increase force output of said spring.

2. Electric actuating means as described in claim 1, wherein:
   (a) said shaft is capable of being rotatably motivated by suitably pulsed electric currents to said motor and further capable of retaining a fixed position when said motor is subjected to continuous electric currents;
   (b) said feedback means are capable of sensing the position of said shaft;
   (c) said electric amplifying circuit means further being capable of generating said pulsed electric currents to said motor in order to rotate the shaft in one direction and to restore a desired balance between said control signal and said feedback signal, secondly, for generating a sufficiently constant current for holding said shaft in a desired position, and thirdly, to cause rotation of said shaft in an opposite direction if desired.

3. Electric actuating means as described in claim 2, wherein said motor is a DC stepper motor.

4. Electric actuating means as described in claim 3, wherein said electric amplifying circuit means comprises:
   (a) a condition circuit for comparing said control signal with said feedback signal for generating error signals if said feedback signal differs from said control signal by a predetermined value;
   (b) a limit circuit for comparing said feedback signal with an adjustable limit voltage signal for generating a different signal is said feedback signal differs from said limit voltage signal by a second predetermined value;
   (c) a logic circuit for generating a pulsed error signal if one or both of said error signals and said different error signal are present;
   (d) a switching and driver circuit for generating said pulsed electric currents for energizing said DC stepper motor in the presence of said pulsed error signals, and for generating said sufficiently constant current to prevent a rotation of said DC stepper motor by said mechanical means in case said error signals are substantially not existing and for de-energizing said DC stepper motor in case said rotation of said shaft in said opposite direction is desired.

5. Electric actuating means as described in claim 2, wherein said electric amplifying circuit means further comprises means for establishing limits for the control signal above which there is no further generation of said pulsed electric currents to said motor even though there may still exist an imbalance between said control signal and said feedback signal.

* * * * *